Figure 1:
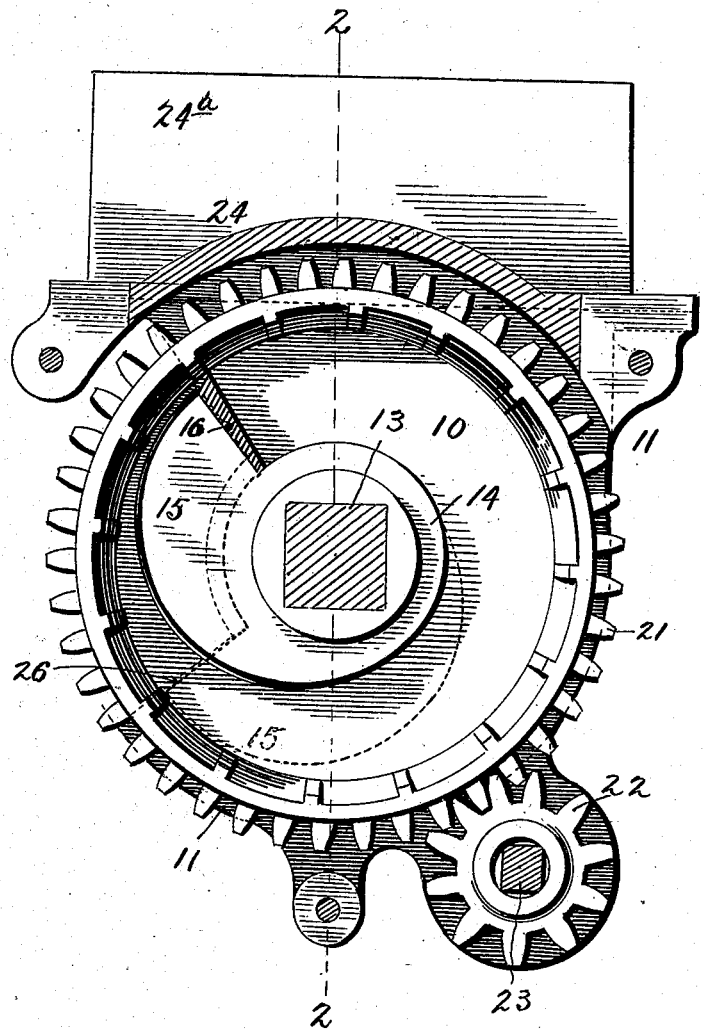

H. B. BOZARD.
GRAIN DISTRIBUTER.
APPLICATION FILED JULY 24, 1908.

899,711.

Patented Sept. 29, 1908.
3 SHEETS—SHEET 1.

Witnesses

Inventor
Harrison B. Bozard
By Chas. H. Fowler
Attorney

H. B. BOZARD.
GRAIN DISTRIBUTER.
APPLICATION FILED JULY 24, 1908.
899,711.
Patented Sept. 29, 1908.
3 SHEETS—SHEET 2.
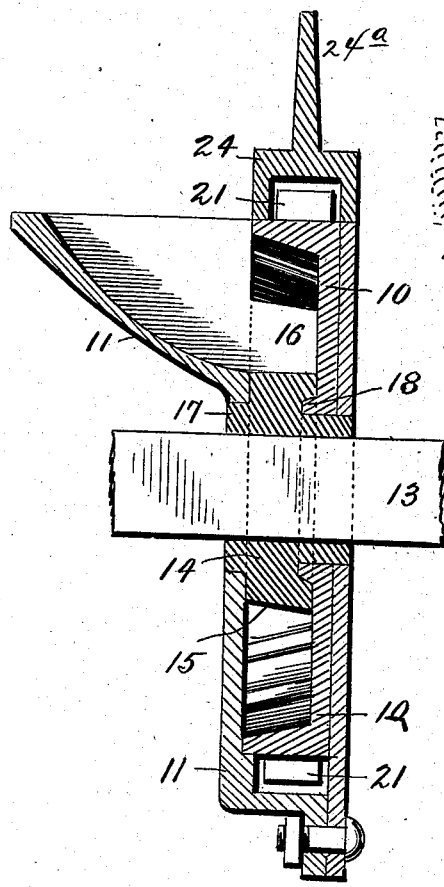
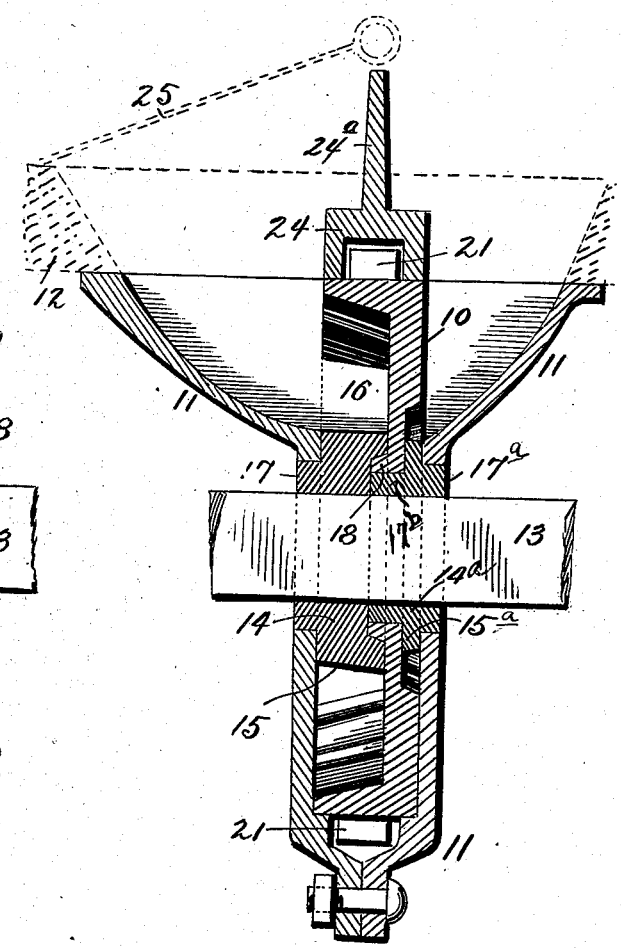
Witnesses
J. R. Hoover
C. J. Williamson
Inventor
Harrison B. Bozard.
By Chas. H. Fowler
Attorney

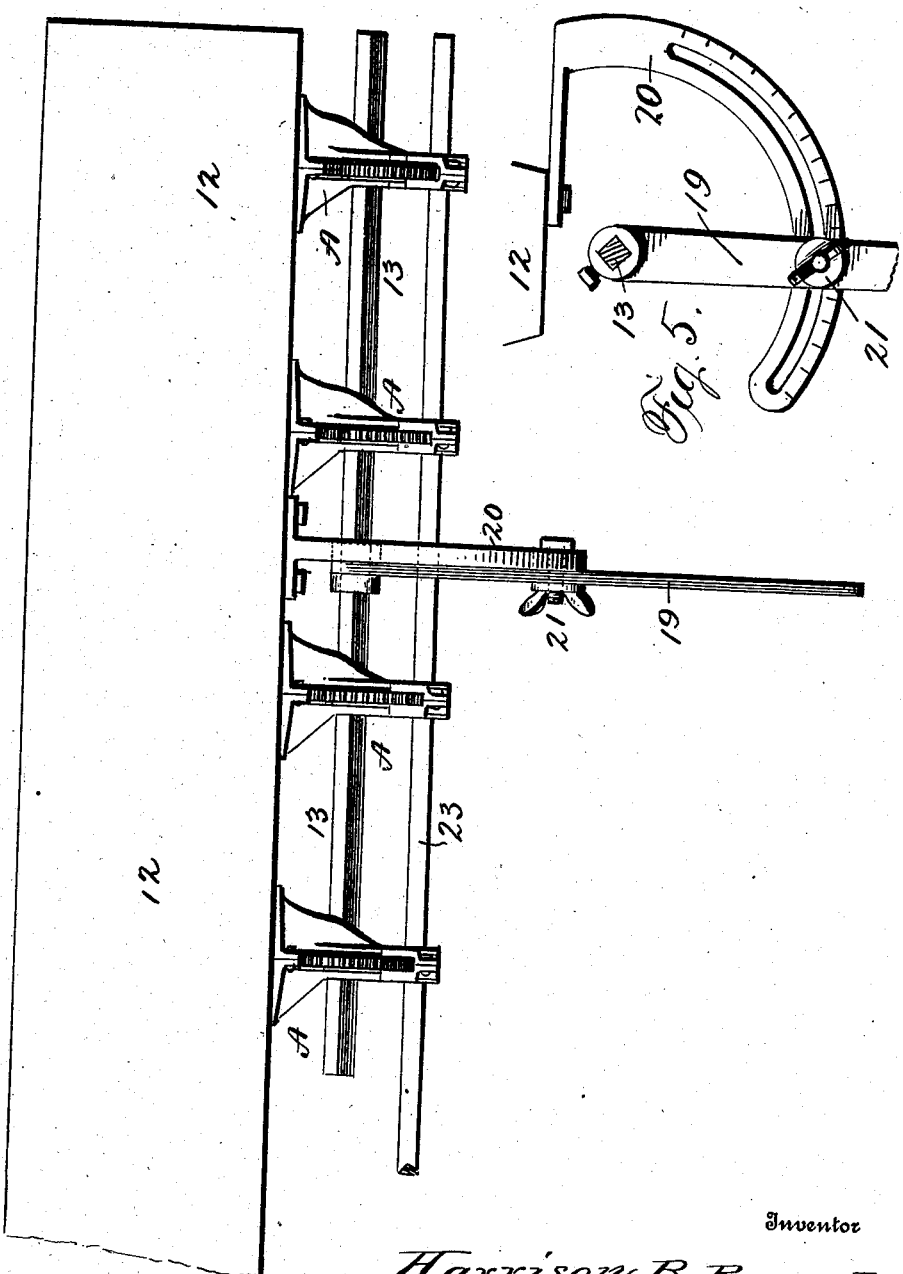

UNITED STATES PATENT OFFICE.

HARRISON B. BOZARD, OF LINCOLN, NEBRASKA.

GRAIN-DISTRIBUTER.

No. 899,711.　　　　Specification of Letters Patent.　　　Patented Sept. 29, 1908.

Application filed July 24, 1908. Serial No. 445,240.

*To all whom it may concern:*

Be it known that I, HARRISON B. BOZARD, citizen of the United States, residing at Lincoln, in the county of Lancaster and State of Nebraska, have invented certain new and useful Improvements in Grain-Distributers, and do hereby declare that the following is a full, clear, and exact description of the same, reference being had to the annexed drawings, making a part of this specification, and to the letters and figures of reference marked thereon.

My invention relates to adjustable seed distributing devices of the class in which a wheel is employed to feed the seed from the hopper to the grain conduits or furrow openers, and the principal object of my invention is to construct the feeder so that it will accurately feed a desired quantity of seed whatever may be the quantity determined on, and do it smoothly and easily without injury to the seed, and without possibility of variation from the intended adjustment by reason of derangements of parts of the mechanism, due to torsion or lack of firmness of support of the moving parts, and to this end my invention consists in the seed distributing device constructed substantially as hereinafter specified and claimed.

In the drawings—Figure 1 is a side elevation of a seed distributer embodying my invention, one side of the wheel casing being removed; Fig. 2 is a vertical section on the line 2—2 of Fig. 1; Fig. 3 a similar view illustrating an embodiment of my invention in which two adjusting devices are embodied in the same distributer for sowing different sizes of seeds; Fig. 4 an elevation of a portion of a hopper and showing several distributers to illustrate the location of the lever for rotating the adjusting shaft; Fig. 5 an end elevation thereof.

My present invention is embodied in a feeding mechanism of the general type comprising a vertical feed wheel 10, and a casing 11 in which it is mounted to revolve so as to feed therethrough seed that enters the top thereof from a hopper 12, and deliver it from the discharge orifice 26 in predetermined measured quantity. The wheel as usual is dished to form an outwardly flaring rim or surface and provided with seed engaging ribs or grooves and the casing is as usual formed of two matching parts or halves having male and female parts formed on abutting surfaces and bolted together. In all these particulars, changes can be made without departure from my invention.

Concentric with the feed wheel is a shaft 13 of a length to pass through several distributers A (see Fig. 4) on the hopper 12 and mounted in the wheel chamber upon said shaft so as to be rotatable by the shaft, is my feed-adjusting or regulating device. Said device comprises a central hub-like portion 14, and an eccentric portion 15 whose periphery consists of a curve starting from the hub 14 and uniformly and constantly increasing in distance from the shaft axis or in radial lines so that it is of scroll or spiral form, and as I prefer to make it, it extends through an angle of about 160°, although of course, I do not confine myself to any particular angle, and at its point of greatest radius it terminates abruptly in a radial shoulder that meets the periphery of the hub 14 and with a flange 16 on the casing forms a stop to determine or fix the position of the regulator for maximum feed. When the regulator is in the position for maximum feed, the point of greatest radius is in a plane above a horizontal plane passing through the axis of the shaft and as the discharge orifice is below said horizontal plane and the outer wall of the throat and the periphery of the wheel rim are arcs of circles or curves concentric with the shaft axis, it will be evident that by rotating the shaft and with it the regulator device to move the eccentric portion 15 thereof downward, it will have the effect of contracting the throat or passage through which the seed is moved by the rotation of the feed wheel gradually and uniformly throughout the angle through which the eccentric or scroll portion of the regulating device extends, and the throat or discharge passage being greatest in capacity at its end nearest the hopper and gradually and regularly decreasing in capacity from such point downward to the point of discharge, it will clearly be evident that with my regulator device there is no abrupt or violent contraction of the discharge throat, but the contraction is a uniform and gradual one, so that clogging of the seed and grinding of the seed will be impossible in my distributer. In all adjustment from the position for maximum feed to the position for minimum feed there is a definite proportion maintained in the throat or discharge passage between the inlet and discharge ends thereof and at all intermediate points.

To prevent clogging or lodgment between the periphery of the regulator, and the wheel rim, I preferably incline it from the side next the bottom of the wheel chamber or cavity outward and inward toward the shaft axis so that, as is clearly shown in Figs. 2 and 3 the space between the periphery of the regulator and the rim of the feed wheel is an outwardly enlarging or increasing one.

A single regulator may be used, for each distributer as illustrated in Fig. 2, but I prefer, as illustrated in Fig. 3 to use two regulators for one distributer, and of different sizes, so that at will, the one distributer may be used for sowing seed of different finenesses, the larger regulator, for example, being used for sowing wheat, and the smaller one for sowing alfalfa. In such a case as this, a single feed wheel is used, and it has a chamber or cavity in both sides, but of different diameters, in one of which is located one regulator and in the other chamber the other regulator, and both regulators are mounted on the same shaft 13. The only difference between the two regulators and the cavities in which they are located, is a difference of size, the form or shape of the regulators being the same and the form of the two cavities being the same. The smaller regulator is designated 15$^a$ and its hub 14$^a$. In my distributer, as illustrated in Fig. 3, each regulator hub has an outwardly projecting collar designated 17 in the case of the larger regulator and 17$^a$ in the case of the smaller regulator, that has a bearing fitted in a circular opening in the contiguous wall of the distributer casing, and on its inner side the hub of the smaller regulator has a collar 17$^b$ which journals the feed wheel, and the feed wheel in order to have a good bearing upon said collar on its side next the larger regulator has an annular flange 18, which has a bearing fitting an annular cavity or chamber in the contiguous side of the hub 14 of the larger regulator. It will be seen that by the construction that I have just described, the bearing of the seed wheel is of such diameter and length, and it is so supported on opposite sides by the two regulators that it will run easily and be restrained from movement either in a sidewise or other direction, so that irregularity of the action of the feed wheel and disturbance of the desired adjustment of feed are prevented. In such a case, a shaft of good size in cross-section can be employed by reason of its location, concentric with the feed wheel and the wheel adjusting shaft can be made of such size as to be free of such torsion or twisting as would preclude accurate adjustment as to the wheel. To further eliminate twisting or torsion of the shaft as a disturbing factor in adjusting the feed, I mount or apply to the shaft 13, the rotating handle or lever 19 at or near its longitudinal center instead of at the end as has heretofore been done.

For accurate adjustment of the regulator, I use with the lever 19 an arc-shaped bar 20 that is secured to the hopper concentric with the shaft 13, which has a curvilinear slot engaged by a clamping bolt 21, on the lever. I mark on said bar, contiguous to the clamping bolt, a series of graduations to denote the various adjustments, the clamping bolt being provided with or serving as an index to coact with the graduation.

For revolving the feed wheel, its periphery is provided with spur-teeth 21 constituting a gear wheel that mesh with a pinion 22 on the driving shaft 23 which is suitably geared to a source of power. The gear teeth of the wheel, where they project into the hopper, are covered by a housing 24, and said housing is utilized to support a partition 24$^a$ to direct the seeds to one side of the double feed wheel or the other side thereof, as shown in Fig. 3. A suitable damper 25 is provided at the top of the partition to direct the seed from the hopper to the one side of the double feed wheel or the other.

With my distributer, as the adjustment of the quantity of seed to be fed is perfectly secured by the eccentric regulator, the matter of speed of revolution of the wheel does not enter at all as a factor, although for feeding seed widely differing in size, it may be desired to provide, at least two changes of speed. Of course, if desired, any number of changes of speed may be employed with my invention. Small seed requires a higher speed, to sow accurately, than large seed.

With my distributer constructed to sow both large and small seed, it has a greater range from maximum to minimum than any distributer now used.

The regulator is shown in full lines in Fig. 1 in the position for maximum feed, and dotted lines in said figure for minimum feed, in which position, the radial shoulder or the eccentric is contiguous to the outlet 25 of the casing.

When two regulators are used for the same feed wheel, they are mounted upon the shaft 13 in the same position, so that one distributing mechanism answers for both regulators.

I am aware that it has been proposed to use a swinging gate having a surface eccentric to the center of motion of the gate, but in such case the eccentric surface was not one starting from the hub of the gate but it was on an abrupt offset from the hub, so that an abrupt shoulder was formed that made impossible any gradual regulation of the size of the throat at the inlet, which is located substantially in a plane passing horizontally through the axis of the feed wheel, with the result that while the throat at and towards the outlet or discharge end might be reduced in size, there would be no corresponding or proportionate reduction at the inlet end, and the result would be such clogging of the throat that in practice the device was inoperative. With my regulator, the eccentric surface starts immediately from the cylindrical surface of the hub, and gradually increases in distance from the shaft axis, so that at all points of its adjustment from minimum to maximum feed, the entire throat is proportionately and regularly varied in size.

Having thus described my invention what I claim is—

1. A grain distributer having a rotatably adjustable feed regulator with a feed regulating surface that is eccentric to the axis of adjustment and having a central portion or hub from the periphery of which the eccentric surface starts.

2. A grain distributer having a rotatably adjustable feed regulator with a feed regulating surface that is eccentric to the center of adjustment and having a central portion or hub from the periphery of which the eccentric surface starts, and a feed wheel concentric with said center.

3. A grain distributer having a rotatably adjustable feed regulator with a feed regulating surface that is eccentric to the axis of adjustment and having a central portion or hub from the periphery of which the eccentric surface starts, in combination with a seed directing surface concentric with said axis.

4. In a grain distributer, the combination of a suitable casing, a feed wheel journaled therein having a chamber in its side forming a seed-engaging rim, and a rotatably adjustable feed regulator concentric with the feed wheel provided with a hub or central portion with a rounded surface, and having an eccentric seed-engaging surface that starts from said rounded surface on the hub.

5. In a grain distributer the combination of a suitable casing, a feed wheel, having chambers in opposite sides to form seed-engaging rims, a feed regulator in each of said chambers and an adjusting shaft common to both feed regulators.

6. In a grain distributer, the combination of a suitable casing, a feed wheel, having chambers in opposite sides to form seed-engaging rims, a feed regulator in each of said chambers, hubs on the feed regulators journaling the feed wheel, and a shaft on which both of said regulators are mounted.

7. In a grain distributer, the combination of a suitable casing, a feed wheel having chambers in opposite sides to form seed-engaging rims, a feed regulator in each of said chambers, and an adjusting shaft on which both feed regulators are mounted so that both may be adjusted thereby, said feed wheel being concentric with said adjusting shaft.

8. In a seed distributer, the combination of a suitable casing, a feed regulator, a shaft on which the regulator is mounted, and bearings on the regulator for the feed wheel.

9. In a seed distributer, the combination of a suitable casing, a feed wheel, a rotatably adjustable regulator, turning concentric with the axis of the feed wheel, and which journals the feed wheel, and a lateral or side bearing between the regulator and the feed wheel.

In testimony whereof I affix my signature in presence of two witnesses.

HARRISON B. BOZARD.

Witnesses:
E. HOLBROOK,
ROSE M. SEFTON.